United States Patent
Benattar

(10) Patent No.: US 9,747,367 B2
(45) Date of Patent: Aug. 29, 2017

(54) COMMUNICATION SYSTEM FOR ESTABLISHING AND PROVIDING PREFERRED AUDIO

(71) Applicant: STAGES PCS, LLC, Princeton, NJ (US)

(72) Inventor: Benjamin D. Benattar, Cranbury, NJ (US)

(73) Assignee: STAGES LLC, Ewing, NJ (US)

( * ) Notice: Subject to any disclaimer, the term of this patent is extended or adjusted under 35 U.S.C. 154(b) by 0 days.

(21) Appl. No.: 14/827,315

(22) Filed: Aug. 15, 2015

(65) Prior Publication Data

US 2016/0162254 A1    Jun. 9, 2016

Related U.S. Application Data

(63) Continuation-in-part of application No. 14/561,972, filed on Dec. 5, 2014.

(51) Int. Cl.
*G06F 17/00* (2006.01)
*G06F 17/30* (2006.01)
(Continued)

(52) U.S. Cl.
CPC ........ *G06F 17/3074* (2013.01); *G10K 11/178* (2013.01); *H04R 1/1083* (2013.01);
(Continued)

(58) Field of Classification Search
CPC ....... G06F 17/3074; G06F 3/16; H04R 25/00; H04R 1/1041; H04R 1/1083; H04R 25/505; G10K 11/178
See application file for complete search history.

(56) References Cited

U.S. PATENT DOCUMENTS

| 3,806,919 A | 4/1974 | Comey |
| 4,776,044 A | 10/1988 | Makins |

(Continued)

FOREIGN PATENT DOCUMENTS

| AU | 2002300314 B2 | 2/2004 |
| AU | 2003236382 B2 | 3/2005 |

(Continued)

OTHER PUBLICATIONS

Mannion, Patrick, Teardown: Analog Rules Over Digital in Noise-Canceling Headphones, EDN Network, Jan. 11, 2013, 3 pages, USA.

(Continued)

*Primary Examiner* — Simon King
(74) *Attorney, Agent, or Firm* — Mark E. Ungerman; Ungerman IP PLLC

(57) ABSTRACT

An audio customization system responsive to one or more audio profiles to define a transformation to apply to audio information. The system allows users to select the profiles that dictate the nature of the customization of the audio delivered to an audio output devise such as a headphones. The system is set up to be able to lessen the influence of undesirable audio and enhance desirable audio. The system may specify aspects of audio to be modified by specification of filtering algorithm, characterization of audio samples, monitored distortion, user selection, location specification or environmental specification and may be used in a social networking system.

6 Claims, 6 Drawing Sheets

(51) Int. Cl.
  *H04R 1/10* (2006.01)
  *H04R 25/00* (2006.01)
  *G10K 11/178* (2006.01)
  *G10L 21/0208* (2013.01)

(52) U.S. Cl.
  CPC ..... *H04R 25/505* (2013.01); *G10K 2210/108* (2013.01); *G10L 21/0208* (2013.01); *H04R 2225/41* (2013.01); *H04R 2225/43* (2013.01); *H04R 2460/01* (2013.01)

(56) References Cited

U.S. PATENT DOCUMENTS

| | | | |
|---|---|---|---|
| 5,432,858 | A | 7/1995 | Clair, Jr. et al. |
| 5,581,620 | A | 12/1996 | Brandstein et al. |
| 5,619,582 | A | 4/1997 | Oltman et al. |
| 5,638,343 | A | 6/1997 | Ticknor |
| 5,668,884 | A | 9/1997 | Clair, Jr. et al. |
| 5,737,431 | A | 4/1998 | Brandstein et al. |
| 5,764,778 | A | 6/1998 | Zurek |
| 5,778,082 | A | 7/1998 | Chu et al. |
| 5,793,875 | A | 8/1998 | Lehr et al. |
| 5,796,351 | A | 8/1998 | Yabuki |
| 5,822,440 | A | 10/1998 | Oltman et al. |
| 6,462,808 | B2 | 10/2002 | Paritsky et al. |
| RE38,405 | E | 1/2004 | Clair, Jr. et al. |
| 6,816,437 | B1 | 11/2004 | Teller et al. |
| 6,959,075 | B2 | 10/2005 | Cutaia et al. |
| 7,110,552 | B1 | 9/2006 | Saliterman |
| D552,077 | S | 10/2007 | Brunner et al. |
| 7,349,547 | B1 | 3/2008 | Isvan |
| 7,415,117 | B2 | 8/2008 | Tashev et al. |
| 7,430,300 | B2 | 9/2008 | Vosburgh et al. |
| 7,583,808 | B2 | 9/2009 | Smaragdis et al. |
| 7,613,305 | B2 | 11/2009 | Vieilledent et al. |
| 7,620,409 | B2 | 11/2009 | Budampati et al. |
| 7,817,805 | B1 | 10/2010 | Griffin |
| 7,848,512 | B2 | 12/2010 | Eldracher |
| 7,970,150 | B2 | 6/2011 | Oxford |
| D641,725 | S | 7/2011 | Chong et al. |
| 7,995,770 | B1 | 8/2011 | Simon |
| 8,064,607 | B2 | 11/2011 | Monceaux et al. |
| 8,150,054 | B2 | 4/2012 | Andrea et al. |
| 8,155,346 | B2 | 4/2012 | Yoshizawa et al. |
| 8,194,873 | B2 | 6/2012 | Pan et al. |
| 8,229,740 | B2 | 7/2012 | Nordholm et al. |
| 8,290,174 | B1 | 10/2012 | Simon |
| 8,379,874 | B1 | 2/2013 | Simon |
| 8,483,396 | B2 | 7/2013 | Amadu et al. |
| 8,521,316 | B2 | 8/2013 | Louboutin |
| 8,542,843 | B2 | 9/2013 | Andrea et al. |
| 8,577,053 | B1 | 11/2013 | Simon |
| 8,612,187 | B2 | 12/2013 | Amadu |
| 8,768,496 | B2 | 7/2014 | Katz et al. |
| 8,861,756 | B2 | 10/2014 | Zhu et al. |
| 8,873,767 | B2 | 10/2014 | Regler |
| 8,917,506 | B2 | 12/2014 | Diebel et al. |
| 8,934,635 | B2 | 1/2015 | Esnault et al. |
| 9,069,058 | B2 | 6/2015 | Booij et al. |
| 9,087,506 | B1 | 7/2015 | Kraft et al. |
| 9,111,529 | B2 | 8/2015 | Amadu et al. |
| 9,112,464 | B2 | 8/2015 | Amadu et al. |
| 9,113,264 | B2 | 8/2015 | Frater |
| 9,131,308 | B2 | 9/2015 | Kraft et al. |
| 9,226,088 | B2 | 12/2015 | Pandey et al. |
| 9,392,381 | B1 | 7/2016 | Park et al. |
| 9,510,090 | B2 | 11/2016 | Lissek et al. |
| 2002/0188364 | A1 | 12/2002 | Ota |
| 2004/0114777 | A1 | 6/2004 | Aubauer et al. |
| 2005/0117771 | A1 | 6/2005 | Vosburgh et al. |
| 2006/0013409 | A1 | 1/2006 | Desloge |
| 2006/0056638 | A1 | 3/2006 | Schobben |
| 2007/0021093 | A1 | 1/2007 | Chu |
| 2007/0030986 | A1 | 2/2007 | McArthur et al. |
| 2008/0174665 | A1 | 7/2008 | Enstad et al. |
| 2008/0199025 | A1 | 8/2008 | Amada |
| 2009/0010443 | A1 | 1/2009 | Ahnert et al. |
| 2009/0316529 | A1 | 12/2009 | Huuskonen et al. |
| 2010/0034396 | A1 | 2/2010 | Wollmershauser et al. |
| 2010/0128892 | A1 | 5/2010 | Chen et al. |
| 2010/0141153 | A1 | 6/2010 | Recker |
| 2010/0205222 | A1* | 8/2010 | Gajdos ............. G06F 17/30766 707/803 |
| 2010/0239105 | A1 | 9/2010 | Pan |
| 2010/0284525 | A1 | 11/2010 | Sander et al. |
| 2011/0025912 | A1 | 2/2011 | Regler |
| 2011/0081024 | A1 | 4/2011 | Soulodre |
| 2011/0127623 | A1 | 6/2011 | Fueldner et al. |
| 2011/0194710 | A1 | 8/2011 | Prest et al. |
| 2012/0020485 | A1 | 1/2012 | Visser et al. |
| 2012/0087507 | A1 | 4/2012 | Meyer |
| 2012/0177219 | A1 | 7/2012 | Mullen et al. |
| 2012/0182429 | A1 | 7/2012 | Forutanpour et al. |
| 2012/0183163 | A1* | 7/2012 | Apfel ..................... H04R 25/70 381/314 |
| 2013/0034241 | A1 | 2/2013 | Pandey et al. |
| 2013/0035777 | A1 | 2/2013 | Niemisto et al. |
| 2013/0082875 | A1 | 4/2013 | Sorensen |
| 2013/0101136 | A1 | 4/2013 | McElveen |
| 2013/0121505 | A1 | 5/2013 | Duraiswami et al. |
| 2014/0044275 | A1 | 2/2014 | Goldstein et al. |
| 2014/0093093 | A1 | 4/2014 | Dusan et al. |
| 2014/0184386 | A1 | 7/2014 | Regler |
| 2014/0200054 | A1 | 7/2014 | Fraden |
| 2014/0233181 | A1 | 8/2014 | Harms et al. |
| 2014/0270217 | A1 | 9/2014 | Ivanov et al. |
| 2014/0270231 | A1 | 9/2014 | Dusan et al. |
| 2014/0270254 | A1* | 9/2014 | Oishi ..................... H04R 3/04 381/98 |
| 2014/0270321 | A1 | 9/2014 | Fullam |
| 2014/0287806 | A1 | 9/2014 | Balachandreswaran |
| 2014/0301568 | A1 | 10/2014 | Amadu et al. |
| 2014/0307877 | A1 | 10/2014 | Sumioka et al. |
| 2015/0054913 | A1 | 2/2015 | Annau et al. |
| 2015/0055937 | A1 | 2/2015 | Van Hoff et al. |
| 2015/0058102 | A1 | 2/2015 | Christensen et al. |
| 2015/0095026 | A1 | 4/2015 | Bisani et al. |
| 2015/0193195 | A1* | 7/2015 | Lin ..................... H04R 1/1091 700/94 |
| 2015/0201271 | A1 | 7/2015 | Diethorn et al. |
| 2015/0206524 | A1 | 7/2015 | Kraft et al. |
| 2015/0208170 | A1 | 7/2015 | Kraft et al. |
| 2015/0234156 | A1 | 8/2015 | Rondinelli et al. |
| 2015/0309151 | A1 | 10/2015 | Shibata et al. |
| 2015/0312671 | A1 | 10/2015 | Wiggins et al. |
| 2015/0312677 | A1 | 10/2015 | Kraft et al. |
| 2015/0348580 | A1 | 12/2015 | van Hoff et al. |
| 2015/0350768 | A1 | 12/2015 | Terpstra |
| 2015/0355880 | A1 | 12/2015 | Kraft et al. |
| 2015/0373474 | A1 | 12/2015 | Kraft et al. |
| 2015/0382096 | A1* | 12/2015 | Lamar ................. H04R 1/1041 381/74 |
| 2015/0382106 | A1 | 12/2015 | Kraft et al. |
| 2016/0014166 | A1 | 1/2016 | Warrick et al. |
| 2016/0055861 | A1 | 2/2016 | Kraft et al. |
| 2016/0057526 | A1 | 2/2016 | Jaffe et al. |

FOREIGN PATENT DOCUMENTS

| | | |
|---|---|---|
| CN | 103229160 A1 | 7/2013 |
| DE | 102004025533 A1 | 12/2005 |
| EP | 0653144 B1 | 2/1998 |
| JP | 2009188641 A | 8/2009 |
| WO | WO2012048299 A1 | 4/2012 |
| WO | 2014096861 A2 | 6/2014 |

OTHER PUBLICATIONS

Singh, Aarti, Adaptive Noise Cancellation, Dept. of Electronics & Communication, Netaji Subhas Institute of Technology, 2001, 52 pages, India.

(56) References Cited

OTHER PUBLICATIONS

Jezierny, M., Keller, B., Lee, K.Y., Digital Active Noise Cancelling Headphones, School of Engineering and Applied Science, Electrical and Systems Engineering Department, Washington University in St. Louis, May 2010, 25 pages, USA.
Elliott, S.J., Nelson, P.A., Active Noise Control—Low-frequency techniques for suppressing acoustic noise leap forward with signal processing, IEEE Signal Processing Magazine, Oct. 1993, 24 pages, USA.
STMicroelectronics, STA311B Multichannel digital audio processor with FFX Datasheet, Oct. 2013, 102 pages, USA.
MAXIM, Audio Design Guide, 12th Edition, Dec. 2009, 20 pages, USA.
STMicroelectronics, STA308A Multi-channel digital audio processor with DDX Datasheet, Jul. 2007, 63 pages, USA.
Frankfsp, ConcertTronix! The Revolutionary New Way to Attend, Listen and Record Live Concerts with Your Mobile Device!, Sep. 12, 2012, 4 pages, USA.
Austriamicrosystems AG—AMS AG, AS3501 AS3502 Low Power Ambient Noise-Cancelling Speaker Driver DataSheet, 997-2009, 45 pages, Austria.
Austriamicrosystems AG, AS3421/22 Low Power Ambient Noise-Cancelling Speaker Driver DataSheet, 1997-2013, 61 pages, Austria.
Kuo, Sen M. and Morgan, Dennis, R., Active Noise Control: A Tutorial Review, Proceedings of the IEEE, vol. 87, No. 6, Jun. 1999, pp. 943-973, USA.
Kuo, S.M., Panahi, I., Chung, K.M., Horner, T., Nadeski, M., Chyan, J., Design of Active Noise Control Systems with the TMS320 Family Application Report, Texas Instruments Digital Signal Processing Solutions, 1996, 171 pages, USA.
Chowdhry, Amit, 26 Best Noise Cancelling Headphones, Pulse2.0 Technology News Since 2006, Nov. 28, 2012, http://pulse2.com/2012/11/28/best-noise-canceling-headphones/, 18 pages, USA.
Baldwin, Richard G., Adaptive Noise Cancellation Using Java, Java Programing Notes #2360, Apr. 18, 2006, http://www.developer.com/java/other/article.php/3599661/Adaptive-Noise-Cancellation-Using-Java.htm, 15 pages, USA.
FMA Solutions, Inc., Best Noise Canceling Earphones, Westone Noise Canceling Earphones, 2014, earphonesolutions.com/coofsoiseaan.html, 3 pages, Orlando, FL, USA.
Albing, Brad, Noise-Reducing Headphones Hide Analog Heart, Jan. 24, 2013, http://www.planetanalog.com/author.asp?section_id=385&doc_id=558728, 4 pages, USA.
Ruckus Wireless, Inc., Best Practice Design Guide: Deploying Very High Density Wi-Fi—Design and Configuration Guide for Stadiums, http://c541678.r78.cf2.rackcdn.com/appnotes/bpg-highdensity.pdf, 2012, 52 pages, USA.
CNET TV, Monoprice's Noise Cancelling Headphone tries to silence critics, http://scienceheap.com/?rvq, https://www.youtube.com/watch?v=h8_PDtXQu58#t=89, Apr. 10, 2013, 2 pages, USA.
Haynes, Toby, A Primer on Digital Beamforming, Mar. 26, 1988, www.spectrumsignal.com, 15 pages, British Columbia, Canada.
Andrea Electronics Corporation, Digital Super Directional Array, DSDA Far-Field Microphone Technology, 2 pages, Melville, NY, USA.
Reppetto, Stafania and Trucco, Andrea, Designing Superdirective Microphone Arrays with a Frequency Invariant Beam Pattern, IEEE Sensors Journal, vol. 6, No. 3, Jun. 2006, pp. 737-747, Genova, Italy.
Zaunschirm, Markus and Zotter, Franz, Measurement-Based Modal Beamforming Using Planar Circular Microphone Arrays, Proc. of the EAA Joint Symposium on Auralization and Ambisonics, Apr. 3-5, 2014, pp. 75-80, Berlin, Germany.
Dualta, Currie, Shedding Some Light on Voice Authentication, SANS Institute InfoSec Reading Room, 2003, 17 pages, USA.
MiniDSP Ltd., Digital Crossover Basics, www.minidsp.com/, 2009-2014, 4 pages, Hong Kong.
Jiang, Wentao, "Sound of silence": a secure indoor wireless ultrasonic communication system, School of Engineering—Electrical & Electronic Engineering, UCC, 2014, http://publish.ucc.ie/boolean/pdf/2014/00/09-iang-2014-00-en.pdf, retrieved Nov. 24, 2015.
Kendall, Gary S., A 3-D Sound Primer: Directional Hearing and Stereo Reproduction, Computer Music Journal, vol. 19, No. 4 (Winter, 1995), pp. 23-46.
Lu, Yan-Chen; Cooke, Martin, Motion strategies for binaural localisation of speech sources in azimuth and distance by artificial listeners, Speech Comm. (2010), Jun. 12, 2010, ScienceDirect.
Conexant, Conexant AudioSmart Voice & Speech Processing White Paper, Feb. 12, 2014, pp. 1-19.
Parra, Lucas; Fancourt, Craig, An Adaptive Beamforming Perspective on Convolutive Blind Source Separation, Samoff Corporation, Noise Reduction in Speech Applications, Ed. G. Davis, CRC Press, 2002, Princeton, NJ, pp. 1-18.
Geronazzo, Michelle; Bedin, Alberto; Brayda, Luca; Campus, Claudio; Avanzini, Federico, Interactive spatial sonification for non-visual exploration of virtual maps, Int. J. Human-Computer Studies, 85(2016) 4-15, 2015 Elsevier Ltd.
WASSP, WMB-3230, Operator manual, Version V1.1a, Jun. 2013, pp. 1-67.

\* cited by examiner

COMMUNICATION SYSTEM FOR ESTABLISHING AND PROVIDING PREFERRED AUDIO

CROSS REFERENCE TO RELATED APPLICATIONS

This application is a continuation-in-part of co-pending U.S. patent application Ser. No. 14/561,972 filed Dec. 5, 2014, U.S. Pat. No. 9,508,335, the disclosure of which is hereby incorporated herein by reference in its entirety.

BACKGROUND OF THE INVENTION

1. Field of the Invention

The invention relates to audio processing systems and particularly audio processing systems that enhance audio communications in sound-dominated environments.

Personal audio players are nearly ubiquitous. The popularization of smartphones has ushered in an environment where anyone and everyone with a smartphone has an on-board personal audio player. Personal audio is typically delivered to a user by headphones. Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

2. Description of the Related Technology

Active noise reduction; active noise cancellation and active noise control are known in the prior art, Elliot, S. J. et al., "Active Noise Control," IEEE Signal Processing Magazine, October 1993 (pages 12-35), the disclosure of which is expressly incorporated by reference herein, describes the history and background of active noise control systems and describes the use of adaptive filters.

Kuo, Sen M. et al., "Active Noise Control: A Tutorial Review," Proceeding of the IEEE, Vol. 87, No. 6, June 1999 (pages 943-973), the disclosure of which is expressly incorporated by reference herein, describes principles and systems for active noise control.

Kuo, Sen M. et al., "Design of Active Noise Control Systems with the TMS320 Family," Application Report, Texas Instruments Digital Signal Processing Solutions, Digital Signal Processing Products—Semiconductor Group, SPRA042, June 1996, the disclosure of which is expressly incorporated by reference herein, describes specialized digital signal processors designed for real-time processing of digitized signals and details the design of an Active Noise Control ("ANC") system using a TMS320 DSP.

United States Published Patent Application US 2014-0044275, the disclosure of which is expressly incorporated by reference herein, describes an active noise control system with compensation for error sensing at the ear drum including a subjective tuning module and user control.

Active noise control systems utilize various active filtration techniques and rely on algorithms to process source audio in order to reduce the influence of noise on the listener. This may be accompanied by modification of the source audio by combination with an "anti-noise" signal derived from comparing ambient sound to source audio at the ear of a listener.

Active noise control devices in the prior art suffer from being incapable of addressing the wide variation of ambient sound and dominant noise. The particular acoustic sensors used and specific characteristics of headphones or earphones or other listening devices add another layer of complexity to any active noise control system. Furthermore, the type, nature and characteristics of source audio (such as sound from a digital electronic device) are variables ignored in active noise control devices. Finally, individual audio perceptions of each of these and other elements of sound interact to comprise a listening experience are not adequately addressed by active noise control systems.

Adaptive noise cancellation is described in Singh, Arti. "Adaptive Noise Cancellation," Dept. of Electronics & Communications, Netaji Subhas Institute of Technology, (2001). http://www.cs.cmu.edu/naarti/pubs/ANC.pdf#. Accessed Nov. 21, 2014, the disclosure of which is incorporated herein. The customization according to the invention may be performed in accordance with the principles described therein.

Advancements in hearing aid technology have resulted in numerous developments which have served to improve the listening experience for people with hearing impairments, but these developments have been fundamentally limited by an overriding need to minimize size and maximize invisibility of the device. Resulting limitations from miniaturized form factors include limits on battery size and life, power consumption and, thus, processing power, typically two or fewer microphones per side (left and right) and a singular focus on speech recognition and speech enhancement.

Hearing aid technology may use "beamforming" and other methods to allow for directional sound targeting to isolate and amplify just speech, wherever that speech might be located.

Hearing aid technology includes methods and apparatus to isolate and amplify speech and only speech, in a wide variety of environments, focusing on the challenge of "speech in noise" or the "cocktail party" effect (the use of directional sound targeting in combination with noise cancellation has been the primary approach to this problem).

Hearing aid applications typically ignore or minimize any sound in the ambient environment other than speech. Hearing devices may also feature artificial creation of sounds as masking to compensate for tinnitus or other unpleasant remnants of the assistive listening experience for those suffering from hearing loss.

Due to miniature form factors, hearing aids are constrained by a severe restriction on available power to preserve battery life which results in limitations in signal processing power. Applications and devices not constrained by such limitations may provide a high quality listening experience. Such applications and devices are able to utilize high quality signal processing, which among other things, may maintain a high sampling rate, typically at least twice that of the highest frequency that can be perceived. Music CDs have a 44.1 kHz sampling rate to preserve the ability to process sound with frequencies up to about 20 kHz. Most hearing aid devices sample at rates significantly below 44.1 kHz, resulting in a much lower range of frequencies that can be analyzed for speech patterns and then amplified, further necessitating the use of compression and other compensating methodologies in an effort to preserve the critical elements of speech recognition and speech triggers that reside in higher frequencies.

Hearing aids may require compensation for hearing loss at high frequencies, and may require greater levels of amplification in higher and lower frequencies than in midrange frequencies. One strategy to achieve this has been compression (wide dynamic range compression or WDRC) whereby either the higher frequency ranges are compressed to fit within a lower frequency band, or less beneficially, higher frequency ranges are literally cut and pasted into a lower band.

For these reasons hearing aid technologies do not adequately function within the higher frequency bands where a great deal of desired ambient sound exists for listeners, and hearing aids and their associated technologies have neither been developed to, nor are capable as developed, to enhance the listening experience for listeners who do not suffer from hearing loss but rather want an optimized listening experience.

Neither hearing aid nor active noise cancellation technologies are capable of permitting users to communicate with others in their presence while also permitting admission of desirable audio information to the user.

SUMMARY OF THE INVENTION

It is an object to overcome the current deficiency in listening devices that treat sound other than that coming from a source signal as noise or as a disturbance by noise-canceling processes that suppress those disturbances.

The system may, among other things, facilitate a desired interaction with sound. An audio signal may be conducted without either removing a listening device or muting or silencing a source audio signal. The invention may allow a listener to combine and customize one or more sources of sound, both ambient and otherwise, to personalize and enhance a listening experience.

It is an object to overcome the current deficiency in hearing aid and assistive listening device technologies that isolate speech within the ambient environment and classify other sound as noise or as a disturbance and thus apply noise cancellation to suppress non-speech sound and isolate and amplify speech.

It is an object to provide an active noise control system that allows a user to adjust the system based on personal preferences.

It is an object to provide an active noise control system that adjusts or allows a user to adjust the system to respond to environmental noise conditions.

No pre-fixed algorithm can optimally compensate for a wide variation of noise in a matter that is optimal for an individual listener. Every individual hears sound in a different way, and noise cancellation may be optimized by providing a system that allows a user to either adjust the filtration algorithms or switch among them in a variety of ways to enhance the listening experience.

A wide variation of environments including background noise and dominant noise types, variations in sensor characteristics and positioning, and variation in speakers create a complex profile that cannot be adequately compensated for by static active filtration algorithms.

For this reason, an adjustable active filtration system in combination with customizable digital signal processing may be utilized in active noise reduction.

It is an object to enable a consumer audio device or assistive listening device user to avoid having to choose between listening to a source signal or listening to environmental audio as captured by one or more microphones.

It an object to introduce those aspects of the ambient sound environment that a listener identifies as desirable into the source or streamed listening environment, and to make one or more adjustments to enhance the resulting combined sound.

It is a further object of the invention to allow users to utilize a library of predetermined desirable sounds and profiles or "experiences" to result in an immediately enhanced listening experience and also allow users to add additional desirable sounds and listening "experiences" to their individual libraries which will provide the system with updated database of information. As an example, a listener may be able to hear important information or hold a conversation with another person without the need to remove the listening device or mute or bypass the source signal. As another example, a listener may be able to utilize a device according to an embodiment of the invention to filter out unwanted elements of ambient noise not relating to speech such as in a live entertainment venue where there is ambient sound that is either too loud or otherwise too distorted relative to a level which would be comfortable for the listener. An embodiment of the invention may enable the listener to customize the ambient sound environment they hear without any input signal from a mobile audio or telephony device, and to adjust a variety of features to tailor the volume and other characteristics of the ambient sound to match their desired preference. Those settings could be saved as an "experience" within their library, along with desirable ambient sounds. Each "experience" can relate to a specific type of sound or can relate to a particular listening environment, such as a car, public transportation of any kind, etc.

Sound spectrographing technology, acoustic fingerprinting, and other audio processing technologies may be used to recognize sounds with unique characteristics which distinguish them in minute ways from other, even very similar sounds, can both record the frequency and time patterns of sounds to identify and classify them, but also effectively read existing spectrographs which may exist in a personal ambient sound library of a user, or which may otherwise reside in a database of available ambient sound spectrographs and decode such spectrographs to inform the digital signal processing and active filtration systems of those patterns which should be treated as desired ambient sounds and thus included in the customized listening environment of a user when they are present in the ambient environment.

It is an object of the invention to provide a system for managing a sound library and audio profiles. The user can select one or more profiles from a library for enhancement of the perception of audio. The system may operate by caching profiles and allowing users to download selected profiles.

This can be done by having a repository of sound profiles organized by participants in the system. When a user wants to enhance perception of audio matching another participant's voice, the other participant's voice profile can be obtained from the repository and associated with the requesting user.

Another way of obtaining a profile is for it to be included in an electronic contact card that can be transmitted to the user and saved in a profile library in the same way that a contact card with e-mail and other address information is saved to a user's contacts. The system may then access the voice profile in a manner similar to a telephone application obtaining a telephone number from contacts or as an e-mail client obtains an e-mail address from a contact.

The voice profile library and/or the active voice profiles may be saved locally on a user device. Audio processing and profile storage may be on a user client device or a server device depending on computational and communication resources available.

There are many uses for such an enhancement to an active noise control and customized audio system. This may be used to enhance perception of an individual speaker in a lecture environment, for example, a university professor in a lecture hall. The system may also be used by friends in a noisy environment such as in a school hallway, a bar/club or at a concert. This could eliminate the need for yelling to be heard or straining to hear a friend. At the same time the user can keep the headphone on the user's ears and continue to listen to source and/or ambient audio at a normal or customized level.

A user may select which sounds are to be heard from both the ambient environment and the source signal, and to apply a variety of adjustments/mixing controls to that combined sound environment to ensure the appropriate blending of the sounds, such adjustments to include, but are not limited to, relative volume, timing delays, distance compensation between microphones or both microphones and source signals and a wide variety of other adjustments One or more appropriate noise cancelling algorithms may be applied. Manual or automatic adjustment of parameters and/or coefficients of an algorithm may be used to change the manner in which the algorithm suppresses noise.

User adjustments to the characteristics of the noise cancelling experience are enabled. The adjustments may include application of predetermined algorithms to one or more frequency bands and/or one or more channels. The system may generate new or custom algorithms to facilitate a desired noise cancellation profile. A user may access or "download" specific algorithms that relate best to a specific environment.

Users may utilize a library of sound profiles to set the audio customizations applied to ambient and source audio. Desirable ambient sounds may be added, among other ways, through an interface which may allow the capture of desirable audio and generation of a sound profile. The sound profile may be added to the library and may operate to specify ambient sounds that may be exempted from noise cancellation. The system may use profiles to pass or exclude audio according to one or more profiles.

The system may be implemented in one or more digital signal processors and/or adaptive filters operating on ambient, directional or directionless, source and noise audio in order to enhance delivery of desirable audio and damp delivery of undesirable audio. The system may be implemented in a single device or in multiple components. The components may be connected wirelessly or in a wired fashion.

A sampling process may be used to distinguish specific voices based on frequency, synchronous energy and modulation characteristics of the sampled audio. For example, the sounds of a child or a spouse or certain important sounds like an alarm, a telephone ringing, a mobile device notification, a ringtone, a doorbell, beach sounds or nature sounds.

An embodiment may incorporate digital signal processing and sampling rates equivalent to those incorporated in high fidelity digital music systems matching the full range of human hearing, e.g. sampling rates of up to 44.1 kHz corresponding to the full dynamic hearing range of an individual without hearing loss.

An embodiment may incorporate multi-channel digital signal processing to divide ambient sound environment into multiple channels based on frequency ranges, directionality, or audio characteristics, including but not limited to modulation rates that correspond to a wide variety of ambient sounds, including speech, among many others, thus enabling the system to identify and learn/store characteristics of unique sounds and sound patterns for inclusion in its database. The inclusion may be subject to approval by the user.

An embodiment of the invention may dynamically adjust attenuation rates across channels and frequency ranges, may have a feature that enables a user to apply adaptive filters to each channel either independently or across all channels simultaneously.

Advantageous features of a system may facilitate adjustment of filtration on the basis of direction of sound sources; signal detection methodology of acoustic measurement among modulation rates, synchronous energy (opening and closing of vocal folds) or signal to noise ratios depending on both the environment and the nature of the sound which is desirable (i.e. speech or other ambient sounds) as well as whether such sound profiles are new or already exist in the listener's library (in which case such methodology selection may be automatic); ambient sound bypass or source sound bypass or other parameters;

The various noise cancelling algorithms that may be utilized or created for use may, among other things, adjust for:

Signal depth, typically measured by noise attenuation in decibels (−dB);

Frequency breadth, relating to how much of the 10 hz to 20,000 hz frequency range is impacted by the noise cancellation algorithm or algorithms, which in the invention might take the form of different algorithms running simultaneously in different frequency ranges in a multi-channel system;

Position, representing the point on the 10 hz to 20,000 hz frequency spectrum the cancellation profile is centered, which point will be subject to adjustment by the listener either by channel or by noise cancelling algorithm, depending on whether one or more channels and/or algorithms are in simultaneous use; and/or Boosting, which represents the extent that noise cancelling algorithms generate additional undesirable sound as a result of the suppression signal exceeding the targeted undesirable sound they are trying to suppress, which would be addressed either by overlapping other noise cancelling algorithms to capture such boosting, or by the addition of identical sound signals to offset such boosting when it appears.

Certain aspects of the adaptive filters may be adjusted in an automated fashion on the basis of adjustments not controlled by the listener, in addition to adjustments controlled by the listener.

The system may have variable inputs to compensate for dominant noise. Dominant noise may be a noise type that is different from a more steady state background noise, for example, the noise created by a conversation may be considered a dominant noise, and the noise otherwise present in the cabin of a moving vehicle—train, airplane, car—is the background noise. Another dominant noise may be noise generated by machinery or audio content of an ambient audio program.

It is possible that each compensation is identified by an automated analysis of the ambient audio, and automated identification such as a beacon transmitting an identification of audio or other environmental characteristics, or a user-controlled modification.

The system may include a profile management system that allows a user to obtain, create, activate and/or deactivate audio profiles to customize audio provided to the user.

An adaptive audio control system may have a memory for storing one or more audio profiles. An adaptive audio controller may be connected to the memory and be configured to apply a transformation defined by the audio profiles to one or more audio signals. In addition, a library of available profiles may be connected to the memory. Advantageously on of the audio sources includes at least one microphone.

The system may execute an audio control method by acquiring one or more audio profiles, establishing an audio transformation as a function of one or more audio profiles; acquiring audio signals from one or more sources; and applying the transformation to said audio signals. The step of acquiring the audio profiles may include the step of identification and designation of an audio representation stored in a library. The audio representation may be in the form of an audio profile. The audio representation may be a recording of an audio signal in which case the method also includes the step of characterizing said audio signal to obtain an audio profile. An audio profile may be generated by identification of characteristics of the audio information. The characteristics may be any parameter that tends to distinguish the audio information. The parameters may be detection of certain phenomes, cadence, tonal qualities or other audio property. The audio profiles may be associated with an identification and authorization information. Acquiring audio profiles may include the steps of searching a library and verifying authorization information associated with an audio profile. The method may include a procedure for issuing an authorization request to an address associated with a profile identification. The method may include designating the effect that an audio profile will have on an audio transformation. For example, a profile of a jackhammer may be designated for inclusion of the characterized audio. A profile of a police siren may be designated for amplification of audio characterized by the profile.

An adaptive audio control system may include an audio customization engine. One or more audio sources may be connected to the audio customization engine. One or more audio outputs may be connected to the audio customization engine. One or more audio profiles may be represented in a configuration control connected to the audio customization engine. A profile manager may be connected to the configuration control. An audio profile repository may be connected to the profile manager. The repository may be associated with a contact application. The repository may include an audio profile storage memory. The adaptive audio control system may include an audio profile generator connected to the profile manager and responsive to an audio source. The adaptive audio control system may also include an authorization invitation system connected to the profile manager.

The system may include an article of manufacture, a method, a system, and an apparatus for an audio customization system. The article of manufacture of the invention may include a computer-readable medium comprising software for a system for generating an audio signature or audio fingerprints. The invention may be embodied in hardware and/or software and may be implemented in one or more of a general purpose computer, a special purpose computer, a mobile device, or other dedicated or multipurpose device.

The article of manufacture of the invention may include a computer-readable medium comprising software for an active noise reduction system, comprising code segments for generating audio signatures.

The system may include a computer system including a computer-readable medium having software to operate a computer or other device in accordance with the invention.

The article of manufacture of the invention may include a computer-readable medium having software to operate a computer in accordance with the invention.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF PREFERRED EMBODIMENTS

Figure 1:
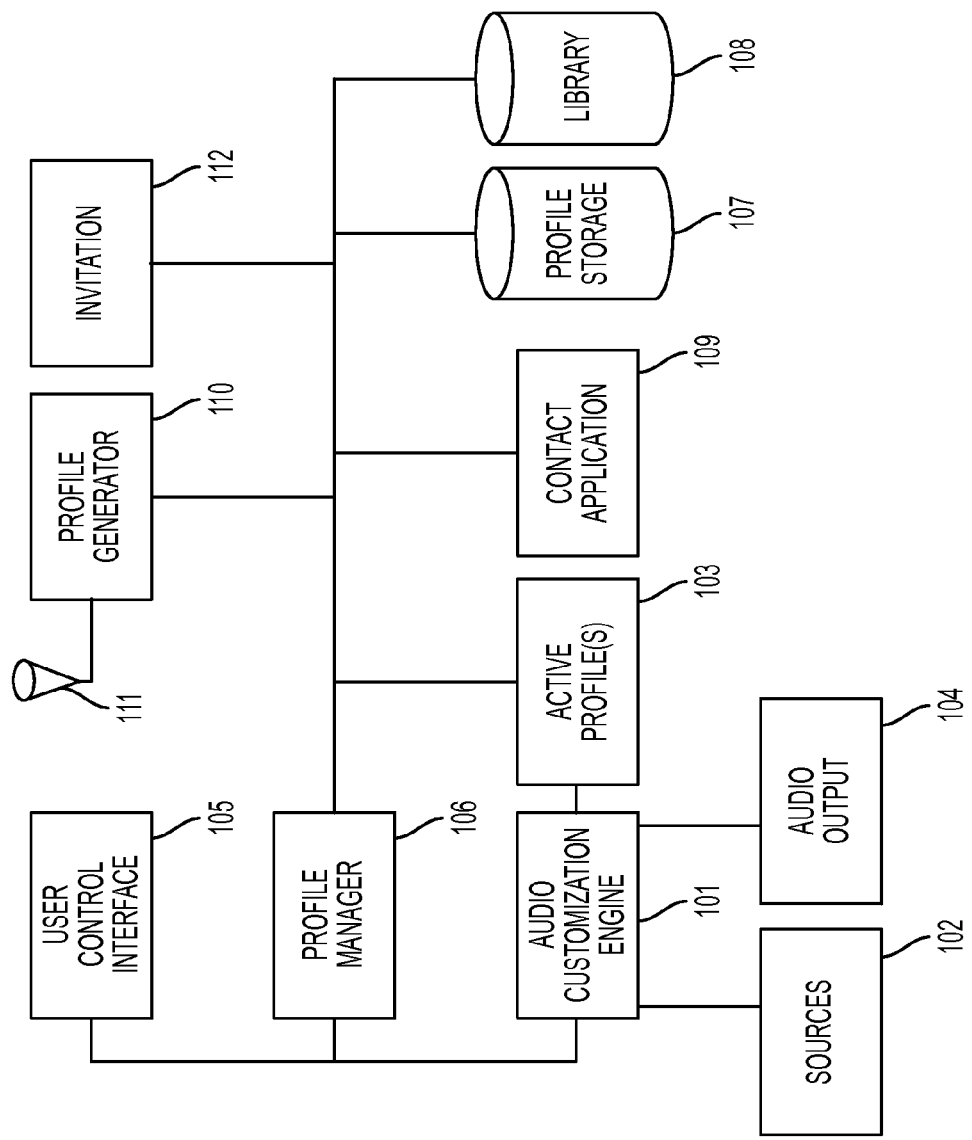
FIG. 1 shows a system for management, acquisition and creation of audio profiles for use in customizing audio.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

An embodiment of the invention may operate to allow a user to select audio received in a headphone. The system may include a programmable audio processor which transmits audio selected by a user to an audio transducer, such as a headphone. The selection of audio can be by audio source and can be particular aspects or portions of an audio signal. It is a recognized problem that when audio is being played through headphones a user can become isolated from his audio environment. Noise canceling headphones designed to increase the perceived quality of audio to a user increase the level of isolation. The embodiment of the invention may be designed to allow a user to selectively decrease audio isolation from the user's environment.

The system may include audio profiles that are selected to control customization of audio provided to a user. FIG. 1 shows a system for management, acquisition and creation of audio profiles for use in customizing audio.

The system may include an audio customization engine 101. One or more audio sources 102 may be connected to the audio customization engine 101. The audio sources advantageously include local audio sensor(s) such as one or more microphones or microphone arrays. The system may have microphones to detect local audio which may be used by the audio customization engine 101 for active noise control.

One or more active profiles 103 may be used by the audio customization engine 101 to customize audio signals provided to an audio output device 104, for example, headphones.

A user control interface 105 operates with a profile manager 106 to designate a set of active profiles. The profile manager 106 can assemble audio profiles to be in active profiles 103. The active profiles 103 may be from one or more sources. The active profiles 103 may include one or more default profile such as car horns or police sirens.

The system may have a user profile storage cache 107 containing profiles obtained or generated by a user. Selected audio profiles may be from user profile storage cache 107, may be transferred or copied to the active profiles 103 for use by the audio customization engine. Another potential source of audio profiles is library 108. The library 108 may contain audio profiles indexed by a directory to allow a user to select an audio profile from a remote source. The library 108 may contain profiles for individuals, environments, specified sounds or other audio components.

Audio profiles may also be stored in the contacts for a user or organization. The profile manager 106 may access a contacts application to obtain audio profiles contained in a contacts application.

A profile generator 110 may be present and connected to profile manager 106. The profile generator 110 may sample audio from a microphone 111 and process the sampled audio to generate an audio profile. The generated profile may be placed directly in the active profiles 103, added to a contact 109 or stored in user profile storage cache 107 or library 108. The audio profiles may be associated with appropriate metadata to facilitate location, identification and use.

An invitation system 112 may be connected to the profile manager 106 in order to invite another user or system to provide an audio profile or sample audio to generate a profile. The user control interface 105 may control operation of the profile manager 106 and audio customization engine 101.

The system described herein may be implemented in a personal electronic device such as a smartphone or tablet. The system may be implemented and computation allocated between server and client devices depending on computational, communications, and power resources available.

The system may have or be connected to one or more microphones or microphone arrays, integrated with the housing of a user device or be remote. In the case of a personal electronic device, the system may have a jack to connect an audio sensor. The system may be connected to or integrated with a sound reproduction device such as one or more speakers or headphones. The connection may be by a speaker jack 104. The system may be connected to an audio source, for example, a personal media player such as an MP3 player. The connection may use jack 105.

The system may be provided with an on/off switch and one or more user controls. The controls may be for one or more channels such as a left channel tune adjustment and a right channel tune adjustment. There may be one or more controls for frequency bands per channel. Alternatively, the controls may be for degree in balance in one or more frequency bands. The user controls may be applied to control operations on a server or local operation on a user device.

Figure 2:
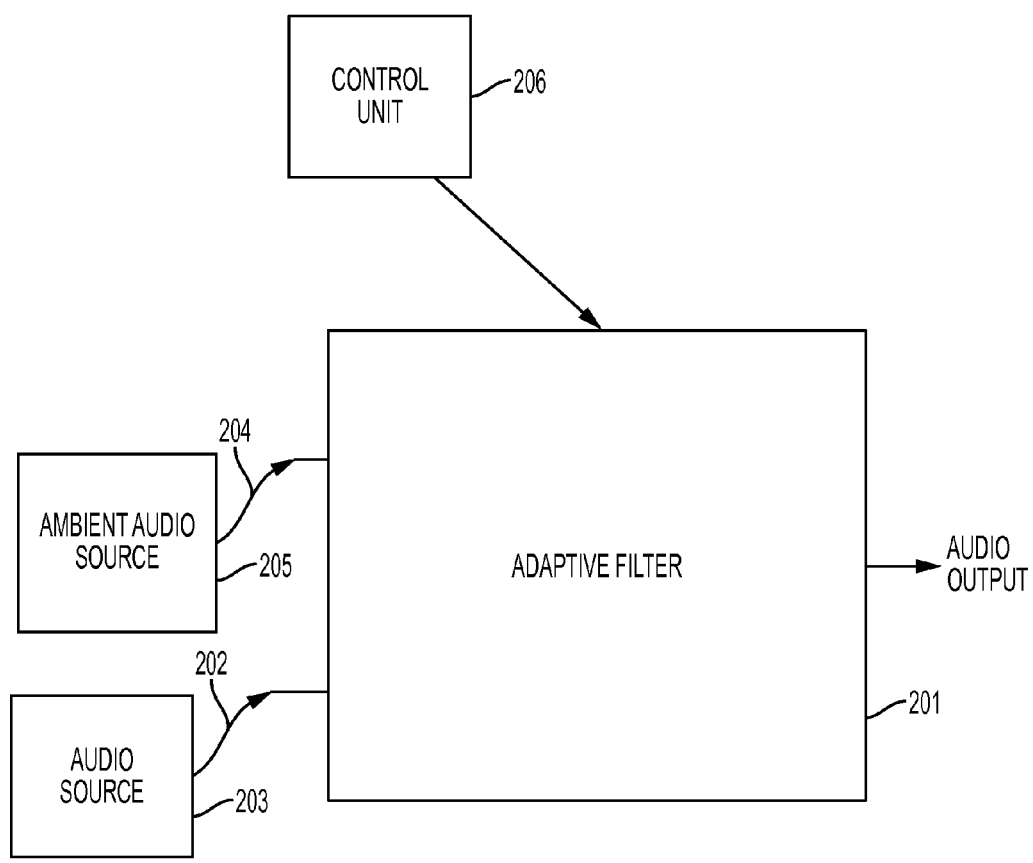
FIG. 2 shows a schematic of an embodiment of the custom audio system using an adaptive filter as an audio customization engine.

FIG. 2 shows a schematic of an embodiment of the custom audio system using an adaptive filter 201 as an audio customization engine.

The adaptive filter 201 may act on one or more audio input signals 202, 204 to condition the audio information for delivery of a modified or customized audio signal to a user. The audio characteristics may be tailored according to a profile selected by a user, a profile determined by audio analysis, a profile indicated by a non-audio input, and/or a preset profile. The adaptive filter may be hardware or software implemented. A software implementation may be executed using an appropriate processor and advantageously by a digital signal processor (DSP). An adaptive filter is a filter system that has a transfer function controlled by variable parameters. An adaptive filter may allow improved control over the adjustment of the parameters.

One or more sources 203, 205 may be connected to adaptive filter 201 to provide audio signals 202, 204. Audio source 203 may be local or remote. Audio source 205 may provide local ambient audio information from one or more audio transducers such as microphones or microphone arrays. Other audio sources may be from remote or specialized audio transducers, mp3 or other audio players, or audio streams, or any other audio source.

The adaptive filter 201 may be connected and responsive to a control unit 206. The control unit 206 may provide parameters which define or influence the transfer function executed by the adaptive filter 201.

Figure 3:
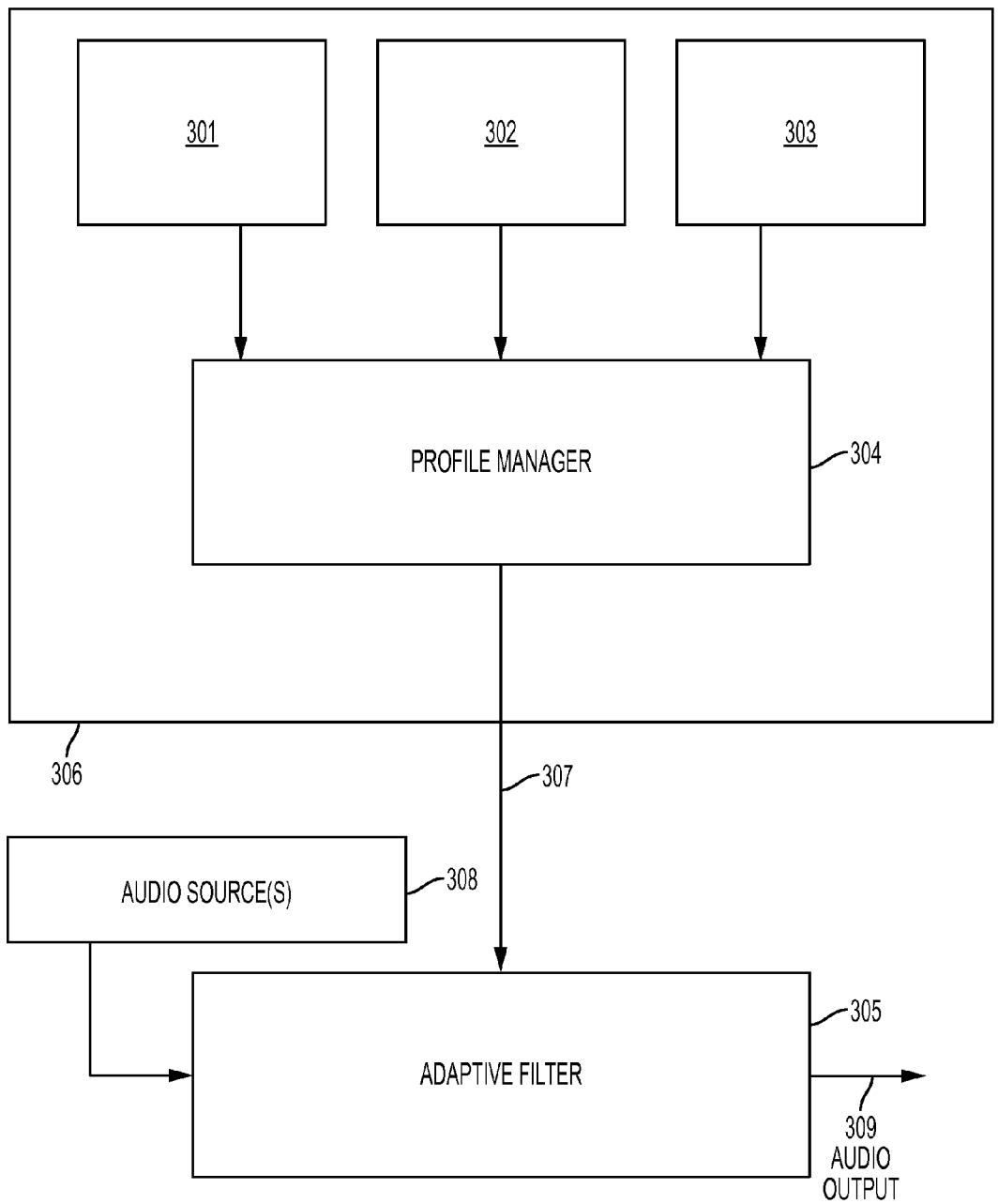
FIG. 3 shows an embodiment of an audio customization system.

FIG. 3 shows an embodiment of an audio customization system 306 showing profile manager 304. The profile manager 304 may be associated with profiles 301, 302, 303.

The profiles 301, 302, and 303 may be mixed and used to control the adaptive filter to create an adaptive filter control signal 307. The profile manager 304 may perform this function. The adaptive filter control signal 307 defines the transfer function used by the adaptive filter 305. For illustration, FIG. 3 shows an audio source(s) 308 which is representative of one or more audio inputs, including, but not limited to, local microphone(s)/microphone array(s); local audio player; cloud-based audio player; and/or network connected devices etc. The invention is not limited by the source(s) or type of source(s). The adaptive filter 305 applies the transfer function defined by the profile manager 304 to the audio sources 308 and outputs to an audio output 309. The mixing function may also be performed in the adaptive filter itself, depending on implementation choices.

Figure 4:
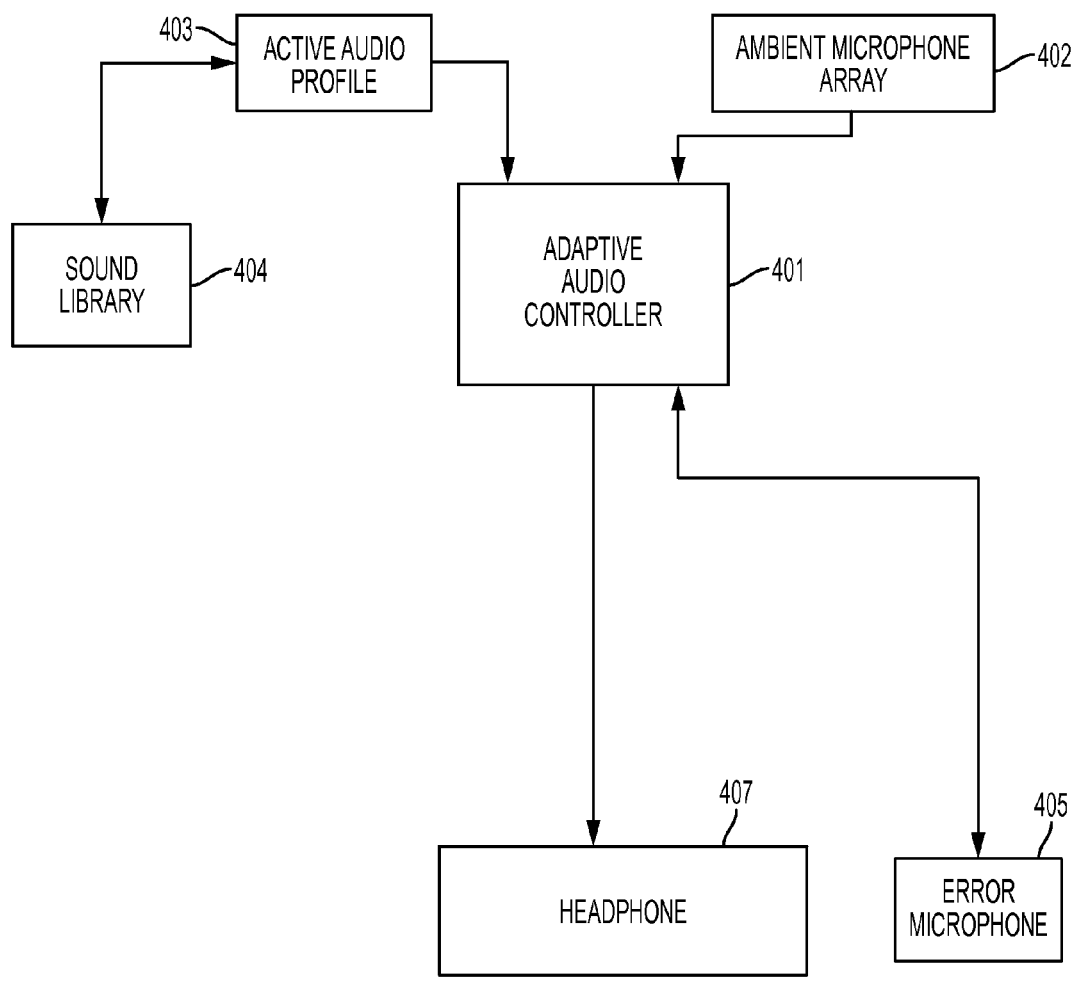
FIG. 4 shows a system layout according to an embodiment of the invention.

FIG. 4 shows a system layout. An adaptive audio controller 401 may be provided. The adaptive audio controller 401 may be connected to an audio source(s) 402 which may be one or more microphones or other audio sources including an ambient microphone array. The adaptive audio controller may also be connected to a set of active audio profiles 403. The active audio profiles 403 may be selected from profiles stored in the sound library 404. The sound library 404 may contain audio profiles created by sampling audio information detected by the ambient microphone. If a user wants to establish a profile for certain characteristic audio, the audio may be sampled and characterized in order to create a profile. The sample audio may be used to create an audio profile such as a specific voice, machinery, or other noise. Profiles for a noise, such as a jackhammer or a person the user does not want to hear may be created, as well as profiles to a noise or person the user especially want to hear may be created by isolating and analyzing the specified audio to characterize the audio and establish a profile that can be used by the adaptive audio controller 401, to either enhance or attenuate audio corresponding to the characteristics of the sample.

The adaptive audio controller 401 may be implemented in a multi-channel audio processor, a digital signal processor, for example an Audio-System-On-A-Chip (ASOC) processor. The audio processor may have an auto mode that may divide an audio signal into eight frequency bands. Audio input signals may be divided, shaped or transferred according to controllable frequency bands or in any other manner that may be accomplished by a digital signal processor or other circuitry.

The audio divider may be connected to an audio controller implemented by the DSP which may dictate the manner in which the divided audio input signals are handled. The processed audio channels may then be mixed down to a mono or stereo output. The stereo or two-channel output may connect to a headphone.

Output device 407 may be connected to the adaptive audio controller 401. The audio source(s) 402 may also include one or more error microphones 405 for noise detection and cancellation purposes.

Figure 5:
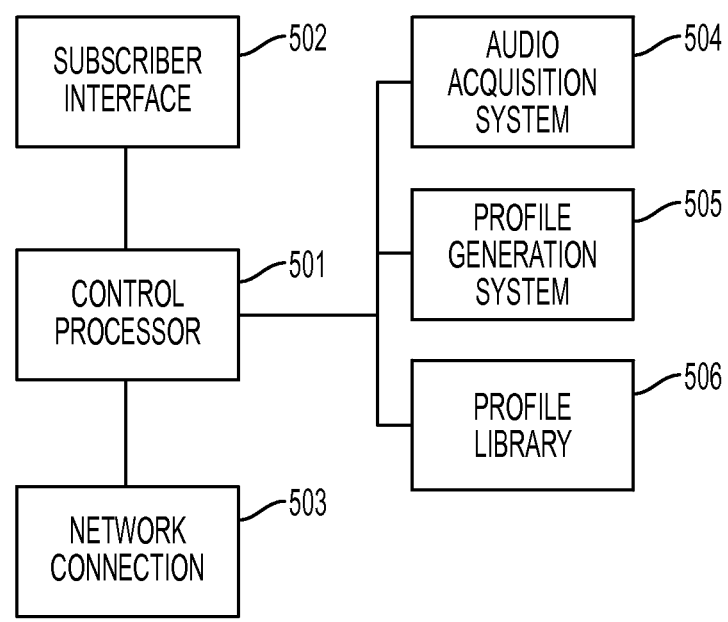
FIG. 5 shows an illustration of networked embodiment of a communications system.

The customization may be used and managed in a networked system. FIG. 5 illustrates an embodiment of a networked communications system for establishing and providing preferred audio. According to an embodiment of the invention, a social networking system may be established where members of the network may authorize and/or request access to enhanced communication with others in the network. The communications may occur over a network or may occur in a non-networked fashion, i.e., people talking within "earshot" of each other. One system implementation is shown in FIG. 5. The system is managed by a control processor 501. A subscriber interface 502 may be utilized by the subscriber's or network members. The subscribers may establish a transformation to be used for their own accessible audio. Subscribers may create their own audio profiles. Subscribers may authorize others to include the subscribers in transformations. A network connection 503 is illustrated, however, processing and communications resources may suggest whether indicated processes are performed centrally on servers or distributed to user devices.

An audio acquisition system 504 may be connected to the control processor 501. The audio acquisition system is used to sample audio. The subscriber interface may include a microphone and a subscriber advantageously will record voice samples which will be processed through the audio acquisition system 504 and provided to the profile generation system 505. The profile generation system is utilized to characterize the nature of the acquired audio in order to establish a generalized filter useful for distinguishing audio content having the same characteristics for use in specifying a transformation. Certain audio signals may exhibit characteristic properties which facilitate establishment of a profile for use in transformation. For example, a telephone dial tone may have a particular narrow frequency which could be measured and profiled. The profile would be used in the transformation in order to filter out that particular frequency. Other audio sources are more complex but may still be characterized for filter generation. Complex audio sources such as individual voices will typically require substantial processing, and as such, centralized server processing may be appropriate. Profiles generated by the profile generation system may be stored in a profile library 506. The subscriber interface 502 may be utilized to identify and select profiles contained in the profile library for incorporation in a subscriber transformation. Advantageously a profile library may include subscriber profiles and generic profiles which may be useful such as police siren profiles, car horn profiles, alarm profiles, etc.

Figure 6A:
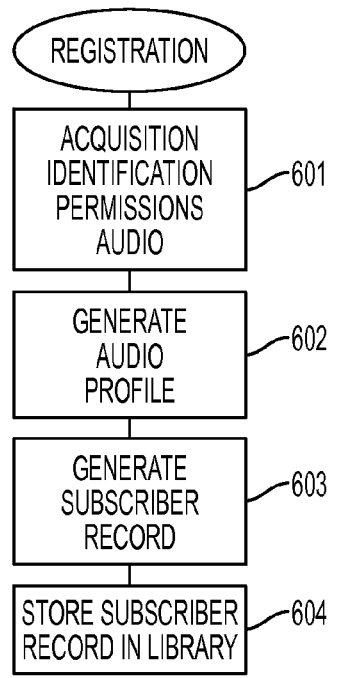
FIG. 6A shows an example of a registration process of an embodiment of a communication system.
Figure 6B:
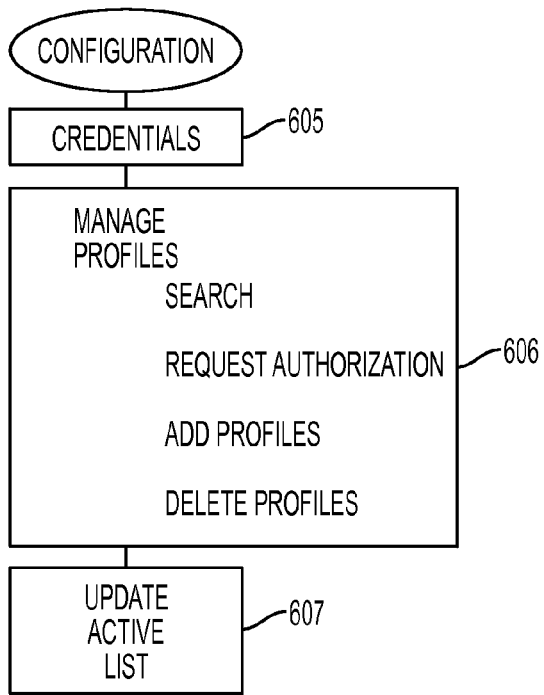
FIG. 6B shows an example of a configuration process of an embodiment of a communication system.
Figure 6C:
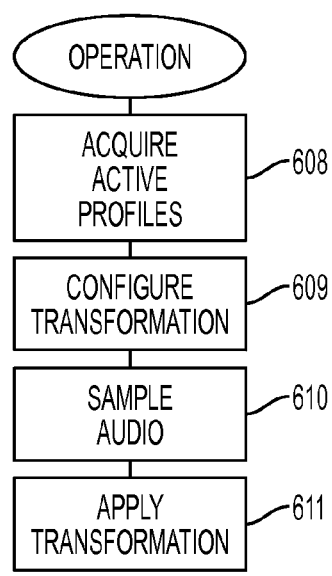
FIG. 6C shows an example of the operation process of an embodiment of a communication system.

FIGS. 6A, 6B, and 6C illustrate operations of an embodiment of the communications system. FIG. 6A illustrates the registration process for the system. Registration is initiated by acquisition operations 601. The acquisition operations acquire information for use in the system for each subscriber. The acquisition process includes acquiring subscriber identification and registering credentials. The acquisition process also involves setting permissions. Setting permissions as a process to establish which subscribers may have access to subscriber profiles. The acquisition process 601 also includes acquiring audio samples from the subscriber. Process 602 serves to generate an audio profile on the basis of audio acquired in process 601. Process 603 generates a subscriber record which includes or links subscriber identifications, subscriber permissions and subscriber audio profiles. Process 604 operates to store the subscriber record in a library for use by the subscribers and those authorized by the subscriber. FIG. 6B illustrates the configuration operation for subscribers. Configuration is initiated when a subscriber connects and submits acceptable credentials for identification and establishing authorization to access the system. The credentials are submitted and verified at process 605. Process 606 illustrates operations to manage profiles. A subscriber, once connected to the configuration system, can manage the profiles which are utilized to generate the subscriber audio transformation. The manage profile operation 606 include search; request authorization; add profiles; and delete profiles. The search function is a mechanism for a subscriber to search for other subscribers and available profiles. The request authorization function may be initiated on the basis of the results of a subscribers search, or on the basis of input on a subscriber identification. The request authorization function initiates an authorization request to another subscriber for access to the other subscriber's audio profile. Once a subscriber has access to the audio profile of another subscriber, the first subscriber may use that audio profile in a transformation to enhance or attenuate audio information having matching characteristics.

The request authorization operation initiates an authorization request to another subscriber. Once that subscriber receives the request, it may be accepted, rejected, or ignored. According to an embodiment, once the request is accepted, the subscriber record of the accepting subscriber is updated to reflect permission granted to the request of the subscriber for use of the audio profile.

The managed profile operation also includes an add profile function whereby a subscriber can select profiles to be activated for that subscriber. Profiles including permissions which are added by a subscriber are then included in the active profiles and utilized to generate a transformation that will be applied to audio information received by that subscriber.

The manage profiles operation 606 also includes a delete profiles function. The delete profiles function serves to deactivate and remove a particular profile from the subscriber's active profiles. The update active lists function 607 operates to modify the subscriber's active audio profiles in accordance with the add profiles function and delete profiles function of the manage profiles operation 606.

FIG. 6C illustrates the operations function of the communications system. Operations are initiated by acquisition of the subscriber's active profiles 608. Once the active profiles are acquired for a session, the system carries out a configure transformation operation 609. The configure transformation operation 609 combines the active profiles into a transformation which may be used by the adaptive audio profiler 401, the adaptive filter 305, or the audio customization engine 101. The system includes a sample audio operation 610 which advantageously utilizes one or more microphones to "listen" to the ambient environment and may include local or networked audio signals combined with the ambient signals.

One or more of the audio signals are provided to an audio processor which provides the audio transformation 611 which is created by the configure transformation operation 609. The transformed audio may be provided to a transducer such as a speaker, and preferably headphones.

The techniques, processes and apparatus described may be utilized to control operation of any device and conserve use of resources based on conditions detected or applicable to the device.

The invention is described in detail with respect to [the] preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of audio signature generation and automatic content recognition have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An audio control method comprising the steps of:
   acquiring one or more audio profiles;
   establishing, by an adaptive audio controller, an audio transformation as a function of said one or more audio profiles;
   acquiring audio signals from one or more sources;
   applying, by an adaptive audio controller, said audio transformation to said audio signals;
   sampling audio information;
   generating an audio profile characterizing said audio information;
   associating said one or more audio profiles with a source identification;
   associating said one or more audio profiles with authorization information; and
   issuing an authorization request to an address associated with said source identification;
   wherein the step of acquiring one or more audio profiles further comprises the steps of searching a library for an audio profile and verifying said authorization information associated with said audio profile.

2. A method according to claim 1 wherein said step of acquiring said one or more audio profiles further comprises the step of identification and designation of an audio representation stored in a library.

3. A method according to claim 2 wherein the audio representation is an audio profile.

4. A method according to claim 2 wherein the audio representation is an audio signal further comprises the step of characterizing said audio signal to obtain an audio profile.

5. A method according to claim 1 further comprising the step of designating the effect that an audio profile will have on an audio transformation.

6. A method according to claim 5 wherein said effect is that audio conforming to an audio profile will not be eliminated by said transformation.

* * * * *